(12) United States Patent
Goto

(10) Patent No.: US 12,529,166 B2
(45) Date of Patent: Jan. 20, 2026

(54) POLYURETHANE ELASTIC FIBER, WINDING BODY THEREFOR, GATHER MEMBER AND HYGIENIC MATERIAL

(71) Applicant: Asahi Kasei Kabushiki Kaisha, Tokyo (JP)

(72) Inventor: Hideyuki Goto, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 418 days.

(21) Appl. No.: 18/019,227

(22) PCT Filed: Aug. 6, 2021

(86) PCT No.: PCT/JP2021/029432
§ 371 (c)(1),
(2) Date: Feb. 1, 2023

(87) PCT Pub. No.: WO2022/034868
PCT Pub. Date: Feb. 17, 2022

(65) Prior Publication Data
US 2023/0287603 A1 Sep. 14, 2023

(30) Foreign Application Priority Data
Aug. 12, 2020 (JP) ................... 2020-136367

(51) Int. Cl.
*D01F 6/70* (2006.01)
*A61L 15/26* (2006.01)
(Continued)

(52) U.S. Cl.
CPC ............... *D01F 6/70* (2013.01); *A61L 15/26* (2013.01); *C08G 18/10* (2013.01);
(Continued)

(58) Field of Classification Search
CPC ......................................... D01F 6/70
See application file for complete search history.

(56) References Cited

U.S. PATENT DOCUMENTS 5,879,799 A 3/1999 Yosizato et al.
6,468,652 B1 10/2002 Tsuru et al.
(Continued)

FOREIGN PATENT DOCUMENTS

EP 3057551 B1 12/2018
JP 2000-313802 A 11/2000
(Continued)

OTHER PUBLICATIONS

Supplementary European Search Report issued in European Patent Application No. 21855947.4 dated Jun. 21, 2024.
(Continued)

*Primary Examiner* — Michael L Leonard
(74) *Attorney, Agent, or Firm* — Morgan, Lewis & Bockius LLP

(57) ABSTRACT

Provided are: polyurethane elastic fibers that achieve heat resistance, adhesiveness, and reelability and that are suitable for a gather member; a winding body therefor; a gather member; and a sanitary material. The present invention relates to: polyurethane elastic fibers that are multifilaments and that contain urethane bonds and urea bonds, the polyurethane elastic fibers being characterized in that the ratio of the urea bonds with respect to the urethane bonds is 0.05 to 5%; a winding body of said polyurethane elastic fibers, wherein the elongation rate of the polyurethane elastic fibers on the winding body is 0.05 to 10%; a gather member; and a sanitary material.

9 Claims, 1 Drawing Sheet

(51) Int. Cl.
  *C08G 18/10* (2006.01)
  *C08G 18/48* (2006.01)
  *C08G 18/76* (2006.01)
  *C09J 5/06* (2006.01)
  *C09J 175/08* (2006.01)

(52) U.S. Cl.
  CPC ..... *C08G 18/4854* (2013.01); *C08G 18/7671* (2013.01); *C09J 5/06* (2013.01); *C09J 175/08* (2013.01); *D10B 2401/061* (2013.01); *D10B 2509/00* (2013.01)

(56) References Cited

U.S. PATENT DOCUMENTS

| | | | |
|---|---|---|---|
| 2002/0161137 A1* | 10/2002 | Wilkinson | C08G 18/0895 528/80 |
| 2006/0030229 A1 | 2/2006 | Fukuoka et al. | |
| 2012/0259074 A1 | 10/2012 | Takayama et al. | |
| 2014/0005348 A1 | 1/2014 | Adachi et al. | |
| 2020/0190702 A1 | 6/2020 | Sato et al. | |

FOREIGN PATENT DOCUMENTS

| | | |
|---|---|---|
| JP | 2001-140127 A | 5/2001 |
| JP | 2001-146636 A | 5/2001 |
| JP | 2002-531636 A | 9/2002 |
| JP | 2004-052127 A | 2/2004 |
| JP | 2006-307409 A | 11/2006 |
| JP | 2016-211131 A | 12/2016 |
| JP | 2017-205433 A | 11/2017 |
| TW | 334454 B | 6/1998 |
| TW | 201923180 A | 6/2019 |
| WO | 00/32855 A1 | 6/2000 |
| WO | 2004/053218 A1 | 6/2004 |
| WO | 2012/124691 A1 | 9/2012 |
| WO | 2015/125753 A1 | 8/2015 |
| WO | 2019/103013 A1 | 5/2019 |

OTHER PUBLICATIONS

International Search Report issued in corresponding International Patent Application No. PCT/JP2021/029432 dated Oct. 26, 2021.
International Preliminary Report on Patentability and Written Opinion issued in corresponding International Patent Application No. PCT/JP2021/029432 dated Feb. 23, 2023.

* cited by examiner

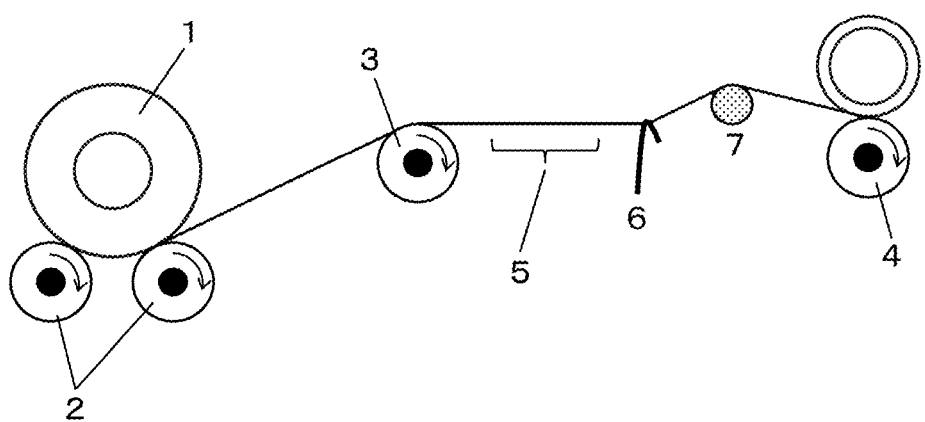

POLYURETHANE ELASTIC FIBER, WINDING BODY THEREFOR, GATHER MEMBER AND HYGIENIC MATERIAL

FIELD

The present invention relates to a polyurethane elastic fiber and its wound body, and to a gather member and a hygienic material.

BACKGROUND

Polyurethane elastic fiber has high ductility and excellent elastic properties. Because polyurethane polymer is a flexible and sticky material, however, problems tend to occur when it is used to produce yarn products, including yarn breakage or production variation due to friction resistance with the wound body reeling guides and rollers, such problems becoming particularly notable when it is used after prolonged storage.

Methods of applying silicone oil or other agents to solve this problem are known.

PTL 1 reports on a method of applying a treatment agent comprising a specific lubricating agent and unwinding property improver to polyurethane elastic fiber in order to solve the problem of progressively worsening unwinding property.

PTL 2 proposes the use of an elastic fiber treatment agent in admixture with a dialkylsulfosuccinic acid salt as a specific component in a specified amount to improve the unwinding property after high temperature storage.

However, when a gather member is produced by inserting a polyurethane elastic fiber produced by the method of PTL 1 or 2 into a nonwoven fabric, coverage of the treatment agent on the polyurethane elastic fiber surfaces has been unstable, leading to problems including inability to obtain sufficient adhesion, and slipping of the yarn into the product.

PTL 3 proposes a polyurethane elastic fiber with improved thermal adhesion by controlling the melting point of the polyurethane as means for obtaining sufficient adhesion, but when a gather member is produced by inserting polyurethane elastic fiber produced by the method of PTL 3 into a nonwoven fabric, the low melting point of the polyurethane elastic fiber has resulted in problems such as a poor unwinding property, while its low heat resistance has led to yarn breakage due to heat in hot-melt coating steps.

The unwinding property, heat resistance and adhesion are thus in a trade-off relationship, and no polyurethane elastic fiber has existed that adequately solves the problems of heat resistance, adhesion and unwinding property during gather production steps.

CITATION LIST

Patent Literature

[PTL 1] Japanese Unexamined Patent Publication No. 2016-211131
[PTL 2] International Patent Publication No. WO2015/125753
[PTL 3] International Patent Publication No. WO2004/053218

SUMMARY

Technical Problem

In light of the aforementioned problems of the prior art, it is an object of the present invention to provide a polyurethane elastic fiber, and its wound body, which exhibit heat resistance, adhesion and unwinding property that are suited for a gather member.

Solution to Problem

As a result of much avid research with the aim of solving the problems mentioned above, the present inventors have found, unexpectedly, that the problems can be solved if the ratio of the urethane bonds and urea bonds forming the polyurethane elastic fiber is controlled to a specific value, and the invention has been completed upon this finding.

This will be described in detail below.

The present invention is as follows.

[1] Polyurethane elastic fiber which is a multifilament and includes urethane bonds and urea bonds, wherein the ratio of urea bonds to urethane bonds is 0.05% to 5%.

[2] The polyurethane elastic fiber according to [1] above, wherein the polydispersity (Mw/Mn) is 1.2 to 4.0.

[3] The polyurethane elastic fiber according to [1] or [2] above, wherein the monofilament size is 5 dtex to 40 dtex.

[4] The polyurethane elastic fiber according to any one of [1] to [3] above, wherein the number of filaments is 15 or greater.

[5] The polyurethane elastic fiber according to any one of [1] to [4] above, which is thermoplastic.

[6] The polyurethane elastic fiber according to any one of [1] to [5] above, which is free of allophanate bond crosslinks.

[7] A wound body of a polyurethane elastic fiber, which is a wound body including polyurethane elastic fiber according to any one of [1] to [6] above wherein the elongation percentage of the polyurethane elastic fiber in the wound body is 0.05% to 10%.

[8] A gather member which includes a polyurethane elastic fiber according to any one of [1] to [6] above.

[9] A hygienic material which includes a polyurethane elastic fiber according to any one of [1] to [6] above.

Advantageous Effects of Invention

The polyurethane elastic fiber and its wound body according to one aspect of the invention, having the construction described above, are a polyurethane elastic fiber and wound body which exhibit heat resistance, adhesion and unwinding property and are suited for a gather member. The gather member and hygienic material according to another aspect of the invention have low yarn loss and a low defective product rate.

BRIEF DESCRIPTION OF DRAWINGS

FIG. 1 is a schematic diagram of an apparatus used for evaluation of unwinding property.

DESCRIPTION OF EMBODIMENTS

An embodiment for carrying out the invention (hereunder referred to as "this embodiment") will now be described in detail. The invention is not limited to the embodiment described below, however, and various modifications may be implemented within the scope of the gist thereof

[Polyurethane Elastic Fiber]

The polyurethane elastic fiber of this embodiment is polyurethane elastic fiber which is multifilamentous and includes urethane bonds and urea bonds, wherein the ratio of urea bonds to urethane bonds is 0.05% to 5%.

For this embodiment, the polyurethane forming the polyurethane elastic fiber is not particularly restricted so long as it has a structure obtained by polymerization of a diisocyanate, polymer polyol, diol or diamine, for example, but it is preferably thermoplastic. The polymerization method is also not particularly restricted. Examples of polyurethanes include polyurethanes polymerized from low-molecular-weight diamine chain extenders comprising a diisocyanate, polymer polyol and active hydrogen compound (hereunder also referred to as "polyurethane urea"), and polyurethanes polymerized from low-molecular-weight diol chain extenders comprising a diisocyanate, polymer polyol and active hydrogen compound (hereunder also referred to as "polyurethane urethane"). A trifunctional or greater glycol or isocyanate may also be used in a range that does not interfere with the effect of the invention. The term "thermoplastic" as used herein means that the compound has a reversible property whereby it can be melted by heating at below its decomposition temperature, exhibiting plastic flow while in the molten state, and then solidifying by cooling. Thermoplastic polyurethane resins generally begin to decompose at 230° C. or higher.

Polymer polyols include, but are not limited to, polymer diols such as polyether-based diols, polyester-based diols and polycarbonate diols. From the viewpoint of hydrolysis resistance, the polymer polyol is preferably a polyether-based polyol and more preferably a polyether-based diol.

Examples of polyether-based polyols include polyethylene oxide, polyethylene glycol, polyethylene glycol derivatives, polypropylene glycol, polytetramethylene ether glycol, copolymer diols comprising tetrahydrofuran (THF) and neopentyl glycol, and copolymer diols comprising THF and 3-methyltetrahydrofuran. Any of these polyether-based polyols may be used alone, or two or more may be used in combination. The number-average molecular weight of the polymer diol is preferably 1000 to 8000. By using a polymer diol in this range it is possible to easily obtain an elastic fiber with excellent ductility, stretch recoverability and heat resistance. Preferred polyether-based polyols from the viewpoint of light embrittlement are polytetramethylene ether glycol, copolymer diols comprising tetrahydrofuran (THF) and neopentyl glycol, and blends of these polyols.

Diisocyanates include aromatic diisocyanates, alicyclic diisocyanates and aliphatic diisocyanates. Aromatic diisocyanates include, but are not limited to, diphenylmethane diisocyanate (hereunder also referred to as "MDI"), tolylene diisocyanate, 1,4-diisocyanatobenzene, xylylene diisocyanate and 2,6-naphthalene diisocyanate. Examples of alicyclic diisocyanates and aliphatic diisocyanates include methylenebis(cyclohexyl isocyanate) (hereunder also referred to as "H12MDI"), isophorone diisocyanate, methylcyclohexane 2,4-diisocyanate, methylcyclohexane 2,6-diisocyanate, cyclohexane 1,4-diisocyanate, hexahydroxylylene diisocyanate, hexahydrotolylene diisocyanate and octahydro-1,5-naphthalene diisocyanate. These diisocyanates can be used alone, or two or more may be used in combination. From the viewpoint of the stretch recoverability of elastic fiber, in particular, the diisocyanate is preferably an aromatic diisocyanate, and more preferably MDI.

The chain extender comprising an active hydrogen compound is preferably one or more selected from the group consisting of low-molecular-weight diamines and low-molecular-weight diols. A chain extender may also be one having both a hydroxyl group and an amino group in the molecule, such as ethanolamine.

Examples of low-molecular-weight diamines as the chain extender comprising an active hydrogen compound include, but are not limited to, hydrazine, ethylenediamine, 1,2-propanediamine, 1,3-propanediamine, 2-methyl-1,5-pentanediamine, 1,2-diaminobutane, 1,3-diaminobutane, 1-amino-3,3,5-trimethyl-5-aminomethylcyclohexane, 2,2-dimethyl-1,3-diaminopropane, 1,3-diamino-2,2-dimethylbutane, 2,4-diamino-1-methylcyclohexane, 1,3-pentanediamine, 1,3-cyclohexanediamine, bis(4-aminophenyl)phosphine oxide, hexamethylenediamine, 1,3-cyclohexyldiamine, hexahydrometaphenylenediamine, 2-methylpentamethylenediamine and bis(4-aminophenyl)phosphine oxide.

Low-molecular-weight diol chain extenders comprising active hydrogen compounds include, but are not limited to, ethylene glycol, 1,3-propanediol, 1,4-butanediol, bishydroxyethoxybenzene, bishydroxyethylene terephthalate and 1-methyl-1,2-ethanediol. These low-molecular-weight diols may be used alone, or two or more may be used in combination. From the viewpoint of stretch recoverability of the elastic fiber, the low-molecular-weight diol is preferably a diol of 2 to 6 carbon atoms, and more preferably 1,4-butanediol.

Polymerization of the polyurethane may be by a publicly known polyurethanation reaction technique, with production by a process such as a one-shot process or prepolymer process. For a prepolymer process, the polymer polyol and diisocyanate in a molar ratio of preferably 1.0:1.8 to 3.0 and more preferably 1.0:2.0 to 2.5 are added to a reaction tank equipped with a warm water jacket and stirrer under nitrogen purging, and the prepolymer reaction is carried out at preferably 40° C. to 100° C. and more preferably 50° C. to 80° C., to obtain a prepolymer with isocyanate groups at both ends. An active hydrogen compound is then added to the prepolymer with isocyanate groups on both ends, in an amount approximately equivalent to the number of functional groups of the isocyanate end groups, for chain extension reaction. The equivalent ratio is preferably 0.95 to 1.1 and more preferably 0.99 to 1.05 with respect to the isocyanate end groups. This may be followed by solid-phase polymerization to obtain a polyurethane of the prescribed molecular weight. As the method of chain extension reaction and solid-phase polymerization, the active hydrogen compound may be directly added to a batch reactor containing the prepolymer at preferably 40° C. to 100° C., and then removed out and subjected to solid-phase polymerization at preferably 60° C. to 200° C. and more preferably 70° C. to 150° C., and pelletized to obtain polymer chips. After uniformly mixing the prepolymer and active hydrogen compound, a cylindrical pipe or twin-screw extruder may be used, with the cylinder temperature in the polymerization zone set to preferably 160° C. to 240° C., to obtain a polymer either continuously or semi-continuously, and then solid-phase polymerization may be carried out at preferably 60° C. to 220° C. and more preferably 70° C. to 150° C.

The polyurethane elastic fiber may also comprise a polymer other than polyurethane, or an additive such as an antioxidant, light fastness agent, ultraviolet absorber, gas discoloration inhibitor, dye, activator, delustering agent or oil agent, so long as the desired effect of the invention is not lost.

From the viewpoint of unwinding property and processability for this embodiment, the polyurethane elastic fiber may be coated with a treatment agent such as an oil agent. Examples of treatment agents include, but are not limited to, silicone oils such as dimethylsilicone, mineral oils, and combinations of the same. The method of coating the treatment agent is not particularly restricted and may be a method of coating with an oiling roller, for example.

Spinning is preferably by a melt spinning method, although this is not particularly restrictive so long as the desired physical properties are obtained. Examples of melt spinning methods include a method of loading polyurethane elastic chips into an extruder, heating and melt spinning, as well as a method of melting polyurethane elastic chips and then mixing them with a polyisocyanate compound and spinning, or a method of adding a reaction mixture of a prepolymer with isocyanate groups at both ends and an active hydrogen compound to a prepolymer with isocyanate groups at both ends, and continuously spinning without forming chips.

The polyurethane loaded into the extruder is metered with a metering pump and directed into the spinning head. If necessary, it may be filtered through a wire mesh or glass beads in a spinning head to remove contaminants, and then discharged from a nozzle and air-cooled with a cold air chamber, coated with a treatment agent, and wound up via a Godet roll.

The method for controlling the ratio of urea bonds to urethane bonds for the polyurethane elastic fiber of this embodiment is not particularly restricted, and for example, the polyurethane urethane bonds may be thermally decomposed in an extruder and reacted with water in an amount corresponding to the generated isocyanate groups, for conversion to urea bonds. Specific methods include a method of adding a fixed amount of water to the polyurethane resin loaded in an extruder, a method of spraying hot steam onto polyurethane yarn that has been discharged from a nozzle, a method of spraying hot steam between godet rolls while winding, and a method of applying a water-containing treatment agent to the yarn at high temperature.

While it is not completely understood why heat resistance, adhesion and unwinding property can be improved if the ratio of urea bonds to urethane bonds in the polyurethane elastic fiber of this embodiment is 0.05% to 5%, the present inventors conjecture as follows. When the ratio of urea bonds to urethane bonds is 0.05% to 5%, the yarn surfaces have urea bonds finely diffused among the urethane bonds, so that the exhibited performance includes satisfactory adhesion as a result of the urethane bonds and satisfactory heat resistance and unwinding property as a result of the urea bonds. The ratio of urea bonds to urethane bonds is the ratio of urea bonds to urethane bonds in the main polymer component constituting the polyurethane elastic fiber, and for example, the urethane bonds and urea bonds in additives in the polyurethane elastic fiber are not considered in calculating said ratio.

The ratio of urea bonds to urethane bonds in the polyurethane elastic fiber of the embodiment is preferably 0.05% to 3% and more preferably 0.1% to 2%.

The weight-average molecular weight (Mw) of the obtained polyurethane elastic fiber is preferably 100,000 to 800,000, more preferably 100,000 to 500,000 and even more preferably 120,000 to 300,000, as measured by GPC with a polystyrene standard.

The number-average molecular weight (Mn) of the obtained polyurethane elastic fiber is preferably 50,000 to 400,000, more preferably 50,000 to 250,000 and even more preferably 60,000 to 150,000, as measured by GPC with a polystyrene standard.

The effect of improved heat resistance, adhesion and unwinding property of the polyurethane elastic fiber of the embodiment is even greater if the ratio of urea bonds to urethane bonds is 0.05% to 5% and the polydispersity (Mw/Mn) of the obtained polyurethane elastic fiber is 1.2 to 4.0 as measured by GPC with a polystyrene standard. The dispersity (Mw/Mn) is more preferably 1.2 to 3.0, even more preferably 1.2 to 2.5 and most preferably 1.5 to 2.5. The reason why the heat resistance, adhesion and unwinding property can be improved by reducing the polydispersity is not completely understood, but the present inventors conjecture as follows. If the ratio of urea bonds to urethane bonds is 0.05% to 5% and the polydispersity is further reduced, the urea bonds on the yarn surfaces become more finely diffuse among the urethane bonds. The method of controlling the polydispersity (Mw/Mn) of the polyurethane elastic fiber is not particularly restricted, but a method using a polymer polyol with controlled polydispersity (Mw/Mn) or a method of lowering the solid-phase polymerization temperature may be suitably employed.

The polyurethane elastic fiber of the embodiment preferably has no allophanate bonds in which isocyanate groups have reacted to crosslink the urethane bonds. By lacking allophanate bonded crosslinks, the urethane groups between monofilaments become crosslinked by isocyanate groups formed when the low-thermostable allophanate bonds are decomposed, thus preventing deterioration of the unwinding property. Crosslinks formed by reaction with isocyanate groups also include biuret bonds formed by reaction of isocyanate groups with urea bonds in addition to allophanate bonds, but since the polyurethane elastic fiber of the embodiment has a low amount of urea bonds, the amount of biuret bonds that can form is also exceedingly low, and therefore the effect of biuret bond formation is negligible.

In a wound body comprising the polyurethane elastic fiber of the embodiment, the elongation percentage of the polyurethane elastic fiber in the wound body is preferably 0.05% to 10%, more preferably 0.05% to 5% and even more preferably 0.1% to 5%, from the viewpoint of improving the unwinding property and adhesion. The reason why the unwinding property can be improved by limiting the elongation percentage to 0.05% to 10% is not completely understood, but the present inventors conjecture as follows. By maintaining a moderate level of elongation of the polyurethane elastic fiber wound body, the urea bonds on the yarn surfaces are kept in a finely diffused state among the urethane bonds, thus improving the unwinding property. The method for producing a polyurethane elastic fiber with a controlled elongation percentage is not particularly restricted, and for example, according to one suitable method the ratio between the first Godet roller speed and the final take-up speed (=final take-up speed/first Godet roller speed) is adjusted while winding up onto the paper pirn.

The monofilament size in the polyurethane elastic fiber of the embodiment is preferably 5 dtex to 40 dtex and more preferably 5 dtex to 30 dtex, from the viewpoint of improving the unwinding property and adhesion. The unwinding property can be improved by limiting the monofilament size to no greater than 40 dtex. Limiting the monofilament size to no greater than 40 dtex increases the yarn surface area, making it possible to increase the hot-melt coating area and improve adhesion. The method for producing a polyurethane elastic fiber with controlled monofilament size is not particularly restricted, and for example, a method of adjusting the polyurethane throughput or adjusting the number of nozzle holes for discharge may be suitably used.

The number of filaments in the polyurethane elastic fiber of the embodiment is preferably 15 or greater and more preferably 20 or greater, from the viewpoint of improving the unwinding property and adhesion. If the filament number is 15 or greater, the amount of urea bonds present on the yarn surfaces will increase, thus allowing the unwinding property and adhesion to be improved. The method for producing a polyurethane elastic fiber with a controlled number of filaments is not particularly restricted, and for example, a method of adjusting the number of nozzle holes for discharge of the polyurethane may be used.

A gather member and hygienic material containing the polyurethane elastic fiber of the embodiment are also each one aspect of the invention. Specific examples of hygienic materials include absorbent articles such as disposable paper diapers and hygienic articles, as well as masks and bandages. Gather members with elastic fibers bonded to a nonwoven fabric via a hot-melt are used for the waist and leg parts of paper diapers, and the gather member of this embodiment may also be suitably used for such parts. The polyurethane elastic fiber of the embodiment has satisfactory heat resistance, adhesion and unwinding property and can therefore be used in processing steps for high-yield production of gather members and hygienic materials.

EXAMPLES

The present invention will now be explained in more specific detail through the following Examples and Comparative Examples, with the understanding that the scope of the invention is not limited by the Examples.

The evaluation methods used in the Examples will now be explained.
<Measuring Methods and Evaluation Methods>
<Measurement of Molecular Weight and Polydispersity (Mw/Mn) of Polyurethane Elastic Fiber>

Polyurethane elastic fiber is dissolved to a solid concentration of 0.25 wt % in a dimethyl acetamide solution containing 0.02 mol/L LiBr, for use as the measuring sample.

The prepared sample is measured under the following conditions with a GPC-101 by Shodex. The molecular weight of the polyurethane elastic fiber is the number-average molecular weight (Mn) or weight-average molecular weight (Mw) calculated from a calibration curve drawn from the peak top molecular weight obtained by measuring an entire polystyrene standard sample (SM-105) by Shodex. The polydispersity of the molecular weight is the value of the weight-average molecular weight divided by the number-average molecular weight (Mw/Mn).

[GPC Measuring Conditions]
  Column: (sample side)→KD-G→KD-806M→KD-806M→KD-802.5→KD-801×3→RI-71S (detector) (all by Shodex)
  Column oven temperature: 60° C.
  Flow rate: 1.0 ml/min
  Eluent: Dimethyl acetamide solution containing LiBr at 0.02 mol/L concentration
<NMR Measurement (Ratio of Urea Bonds to Urethane Bonds)>

The polyurethane elastic fiber was washed with petroleum ether to remove the oil agent, and then Soxhlet extraction was carried out for 5 hours using chloroform as the solvent, to remove the organic compound-based additives. After drying removal of the chloroform for 5 hours at 80° C. in a vacuum of −0.1 MPa, predetermined amounts of polyurethane elastic fiber and dimethyl sulfoxide (internal standard) were taken for measurement by NMR under the following conditions, the specific contents of urethane bonds and urea bonds were calculated, and the urea bond content was divided by the urethane bond content to calculate the ratio of urea bonds to urethane bonds. The urethane bond and urea bond contents can be calculated by the integral value of the hydrogen signal with dimethyl sulfoxide as the internal standard. For example, when calculating the urethane bond content, the integral value for urethane bond hydrogens may be compared with the integral value for methyl group hydrogens of dimethyl sulfoxide. When calculating the urea bond content, the integral value for urea bond hydrogens may be compared with the integral value for methyl group hydrogens of dimethyl sulfoxide. For most cases in general, the hydrogen signal for aromatic urethane bonds is observed at 9.2 to 9.8 ppm, the hydrogen signal for aromatic urea bonds is observed at 8.4 to 9.0 ppm, the hydrogen signal for aliphatic urethane bonds is observed at 6.7 to 7.3 ppm and the hydrogen signal for aliphatic urea bonds is observed at 6.0 to 6.7 ppm, though this is not limitative.

[NMR Measurement Conditions]
  Measuring apparatus: ECS400 by JEOL Corp.
  Measurement nucleus: $^1$H
  Resonance frequency: 400 MHz
  Number of scans: 256
  Measuring temperature: room temperature
  Solvent: heavy dimethylformamide hydride
  Measuring concentration: 1.5 wt %
  Chemical shift reference: dimethylformamide (8.0233 ppm)
<Evaluation of Allophanate Bonded Crosslinking>

Polyurethane elastic fiber that dissolved in the DMAc dissolution test described below but was not confirmed to have allophanate bonds in the NMR measurement described below, was judged to be "without allophanate bonded crosslinks", as the term used herein. Polyurethane elastic fiber that did not dissolve in the DMAc dissolution test or dissolved in the DMAc dissolution test but was confirmed to have allophanate bonds in the NMR measurement, was judged to be "with allophanate bonded crosslinks".
<DMAc Dissolution Test>

The polyurethane elastic fiber is weighed out to 0.2 g and immersed in 10 g of DMAc, and the mixture is stirred at 20° C. for 48 hours. When polymer masses with diameters of 1 mm or greater could not be visually confirmed after stirring, the fiber was judged to have dissolved in the DMAc.
<NMR Measurement (Qualitative Analysis of Allophanate Bonds)>

Predetermined amounts of polyurethane elastic fiber and dimethyl sulfoxide as the internal standard, dried for 5 hours at 80° C. in a vacuum of −0.1 MPa, were taken for NMR measurement. The measurement confirmed the proportion of allophanate bonds with respect to urethane bonds. The proportion of allophanate bonds to urethane bonds can be calculated by comparison of their respective hydrogen integral values, with absence of allophanate groups being defined as a proportion of less than 0.05%. The hydrogen signal for allophanate bonds is generally observed at 10.5 to 11.0 ppm, but this is not limitative.

[NMR Measurement Conditions]
  Measuring apparatus: ECS400 by JEOL Corp.
  Measurement nucleus: $^1$H
  Resonance frequency: 400 MHz
  Number of scans: 256
  Measuring temperature: room temperature
  Solvent: heavy dimethylformamide hydride
  Measuring concentration: 1.5 wt %
  Chemical shift reference: dimethylformamide (8.0233 ppm)
<Polyurethane Elastic Fiber Elongation Percentage in Wound Body (%)>

The elongation percentage (%) of the polyurethane elastic fiber in the wound body was measured and calculated by the following procedure.

A 0.5 m sample of the polyurethane elastic fiber was reeled from the polyurethane elastic fiber wound body in its relaxed-state length (hereunder also referred to simply as "relaxed length"), and the sample weight (g) was measured. The size of the polyurethane elastic fiber in its relaxed state (relaxed size A (dtex)) was calculated by the formula shown below. The measurement was conducted 4 times and the average value was calculated. The "relaxed state" is a state of standing for 2 hours or longer with no load after the yarn has been reeled out from the cheese.

Relaxed size $A$ (dtex)=sample weight (g)×10,000/ relaxed length (m)

The polyurethane elastic fiber was reeled out from the polyurethane elastic fiber wound body and delivered to a length of 50 m by a delivery roll, while maintaining the elongation percentage. The reeled out yarn weight (g) was measured. The size of the polyurethane elastic fiber in its elongated state (print size B (dtex)) was calculated by the formula shown below.

Print size $B$ (dtex)=Total weight of reeled out yarn (g)×10,000/50 (m)

The elongation percentage (%) of the polyurethane elastic fiber in the wound body was calculated by the following formula:

Elongation percentage (%)=($A/B$−1)×100.

<Evaluation of Unwinding Property>

After stripping to a winding thickness of 1 cm from the paper pirn, the elastic fiber wound body was supplied to an apparatus as shown in FIG. 1, and run through under conditions with the elastic fiber delivery roll 2 at a speed of 50 m/min, the pre-draft roll 3 (winding the elastic fiber 3 times) at a speed of 80 m/min and the take-up roll 4 at a speed of 85 m/min. The behavior of the elastic fiber in the observation zone 5 was visually observed for 3 minutes, and swaying of the thread was evaluated on the following scale. For evaluation, a smaller yarn swaying width corresponds to lower friction resistance during use of the yarn, and lower tendency for yarn breakage.

5: Yarn swaying width of ≥0 mm and <2 mm
4: Yarn swaying width of ≥2 mm and <4 mm
3: Yarn swaying width of ≥4 mm and <6 mm
2: Yarn swaying width of ≥6 mm or yarn breakage
1: Yarn breakage When the yarn swaying width was between two levels on the evaluation scale during the 3 minutes of visual observation, the evaluation results were represented as a width of, for example, "3 to 4".

<Evaluation of Heat Resistance>

A test yarn with an initial length of 7 cm was elongated by 200% (21 cm) and pressed against a cylindrical hot body having a cylinder with a surface temperature of 150° C. and a diameter of 6 cm (contact portion: 1 cm), and the number of seconds until breakage was measured and evaluated on the following 5-level scale:

5: ≥60 seconds until breakage.
4: ≥30 seconds and <60 seconds until breakage.
3: ≥10 seconds and <30 seconds until breakage.
2: ≥5 seconds and <10 seconds until breakage.
1: <5 seconds until breakage.

<Evaluation Adhesion>

The hot-melt adhesive (765E by Henkel Japan, Ltd.) which had been melted at 150° C. was continuously coated using a V-slit onto 5 polyurethane elastic fibers that had been aligned parallel at 7 mm spacings and stretched to twice their original length, to a coating coverage of 0.04 g/m per stretched polyurethane elastic fiber, while continuously sandwiching the hot-melt adhesive-coated polyurethane elastic fiber between two nonwoven fabrics (ELTAS GUARD™ by Asahi Kasei Corp.), each having a width of 30 cm and a basis weight of 17 g/m², and continuously contact bonded between a pair of rollers having outer diameters of 16 cm and widths of 40 cm, pressing one of the rollers from above with an air cylinder (CQ2WB100-50DZ by SMC Co.) that was supplied with an air pressure of 0.5 MPa, to fabricate a gather member. The fabricated gather member was immediately cut to a length of 250 mm to 300 mm in the yarn length direction (using this gather member length as the initial length), and attached to a cardboard sheet while stretched to twice the initial length in the yarn length direction. A permanent marker was used to draw marks on the nonwoven fabric of the attached test piece at 2 arbitrary points for a 200 mm length of the polyurethane elastic fiber. The ink infiltrated through the nonwoven fabric, allowing ink marks to be formed on the polyurethane elastic fiber. The polyurethane elastic fiber and nonwoven fabric were cut together at the marks and allowed to stand at 40° C. for 5 hours. After 5 hours, the length between the 2 points marked on the polyurethane elastic fiber was measured and the retention was calculated by the following formula:

Adhesion retention=100×(measured length after 5 hours (mm))/200 mm. A higher retention indicates lower slip-in of polyurethane elastic fiber during production and wearing of products. The measurement was carried out 10 times for each sample, and the rate of slip-in was evaluated on the following evaluation scale based on the number of fibers with less than 80%.

5: No fibers with less than 80% for 10 measurements of adhesion retention
4: One fiber with less than 80% for 10 measurements of adhesion retention
3: 2 fibers with less than 80% for 10 measurements of adhesion retention
2: 3 fibers with less than 80% for 10 measurements of adhesion retention
1: 4 or more fibers with less than 80% for 10 measurements of adhesion retention <Yarn Breakage Resistance During Processing (Overall Evaluation)>

The frequency of yarn breakage when the polyurethane elastic fiber was used in processing steps was evaluated on the following 5-level scale.

5: Evaluation of 5 for unwinding property, heat resistance and adhesion, no yarn breakage during processing.
4: Evaluation of 4 for unwinding property, heat resistance or adhesion, but no evaluation of 3, 2 or 1 for any. No yarn breakage during processing steps.
3: Evaluation of 3 for unwinding property, heat resistance or adhesion, but no evaluation of 2 or 1 for any. Almost no yarn breakage during processing steps.
2: Evaluation of 2 for unwinding property, heat resistance or adhesion, but no evaluation of 1 for any. Only rare yarn breakage during processing steps.
1: Evaluation of 1 for unwinding property, heat resistance or adhesion, and frequent yarn breakage preventing continuous production during processing.

Example 1

A 2400 g portion of polytetramethylene ether diol with a number-average molecular weight of 1800 and a polydispersity (Mw/Mn) of 1.2 in GPC, and 750.75 g of 4,4'-diphenylmethane diisocyanate, were reacted for 3 hours at 60° C. while stirring under a dry nitrogen atmosphere, to obtain a polyurethane prepolymer capped at both ends with isocyanate groups. After then adding 150.95 g of 1,4-butanediol to the polyurethane prepolymer, the mixture was stirred for 15 minutes to obtain a polyurethane with a viscosity of 2000 poise (30° C.).

It was then spread out on a TEFLON™ tray, and the polyurethane in the tray was annealed for 19 hours in a hot air oven at 110° C. to obtain a polyurethane resin. The polyurethane resin had a weight-average molecular weight of 200,000 and a polydispersity of (Mw/Mn) of 2.0 in GPC, with no observed urea bonds.

The obtained polyurethane resin was pulverized to approximately 3 mm powder using a UG-280 pulverizer by Horai Co. The pulverized chips were dried with a dehumidifying dryer under temperature conditions of 110° C. to a moisture content of 100 ppm, and the polyurethane resin powder was loaded from a hopper and melted in an extruder. After metering and pressurizing with a gear pump installed at the head and filtering with a filter, the melt was discharged from a 60-hole nozzle with a 0.23 mm diameter at a speed of 31 g/min. A steam ring set directly below the spinneret was used to spray the discharged yarn with 200° C. steam in an area of 1 cm to 5 cm from the spinneret surface at a flow rate of 0.1 to 0.2 m/s, after which cold air generated in a cold air generator was used for cooling solidification of the yarn which was then converged with a false twisting device by compressed air at 0.20 MPa, and the polyurethane elastic fiber was coated with a surface treatment agent to 2.0 mass % and taken up on a paper pirn with the ratio of the first godet roller speed and final take-up speed (=final take-up speed/first godet roller speed) set to 1.15, to obtain a 620 dtex/60 filament polyurethane elastic fiber wound body. The weight-average molecular weight of the polyurethane elastic fiber according to GPC was 180,000, the polydispersity (Mw/Mn) was 2.0 and the ratio of urea bonds to urethane bonds was 0.5%, while it lacked allophanate bonded crosslinks and had a wound body elongation percentage of 2.0%. The surface treatment agent used was an oil agent comprising 67 mass % polydimethylsiloxane, 30 mass % mineral oil and 3.0 mass % amino-modified silicone.

Example 2

A 620 dtex/60 filament polyurethane elastic fiber was obtained by the same method as Example 1, except that melt spinning was with a temperature of 180° C. for the steam sprayed directly under the spinneret. The weight-average molecular weight of the polyurethane elastic fiber according to GPC was 180,000, the polydispersity (Mw/Mn) was 2.0 and the ratio of urea bonds to urethane bonds was 0.05%, while it lacked allophanate bonded crosslinks and had a wound body elongation percentage of 2.0%.

Example 3

A 620 dtex/60 filament polyurethane elastic fiber was obtained by the same method as Example 1, except that melt spinning was with a temperature of 190° C. for the steam sprayed directly under the spinneret. The weight-average molecular weight of the polyurethane elastic fiber according to GPC was 180,000, the polydispersity (Mw/Mn) was 2.0 and the ratio of urea bonds to urethane bonds was 0.1%, while it lacked allophanate bonded crosslinks and had a wound body elongation percentage of 2.0%.

Example 4

A 620 dtex/60 filament polyurethane elastic fiber was obtained by the same method as Example 1, except that melt spinning was with the steam sprayed directly under the spinneret set to an area of 1 cm to 7 cm from the spinneret surface. The weight-average molecular weight of the polyurethane elastic fiber according to GPC was 180,000, the polydispersity (Mw/Mn) was 2.0 and the ratio of urea bonds to urethane bonds was 2.0%, while it lacked allophanate bonded crosslinks and had a wound body elongation percentage of 2.0%.

Example 49

A 620 dtex/60 filament polyurethane elastic fiber was obtained by the same method as Example 1, except that melt spinning was with the steam sprayed directly under the spinneret set to an area of 1 cm to 10 cm from the spinneret surface. The weight-average molecular weight of the polyurethane elastic fiber according to GPC was 180,000, the polydispersity (Mw/Mn) was 2.0 and the ratio of urea bonds to urethane bonds was 3.0%, while it lacked allophanate bonded crosslinks and had a wound body elongation percentage of 2.0%.

Example 6

A 620 dtex/60 filament polyurethane elastic fiber was obtained by the same method as Example 1, except that melt spinning was with the steam sprayed directly under the spinneret set to an area of 1 cm to 15 cm from the spinneret surface. The weight-average molecular weight of the polyurethane elastic fiber according to GPC was 180,000, the polydispersity (Mw/Mn) was 2.0 and the ratio of urea bonds to urethane bonds was 5.0%, while it lacked allophanate bonded crosslinks and had a wound body elongation percentage of 2.0%.

Example 7

A polyurethane elastic fiber was produced and a 620 dtex/60 filament polyurethane elastic fiber was obtained by the same method as Example 1, except that the annealing conditions in the hot air oven to obtain the polyurethane resin were 80° C. for 24 hours. The weight-average molecular weight of the polyurethane elastic fiber according to GPC was 120,000, the polydispersity (Mw/Mn) was 1.2 and the ratio of urea bonds to urethane bonds was 0.5%, while it lacked allophanate bonded crosslinks and had a wound body elongation percentage of 2.0%.

Example 8

A polyurethane resin was produced and a 620 dtex/60 filament polyurethane elastic fiber was obtained by the same method as Example 1, except that the annealing conditions in the hot air oven to obtain the polyurethane resin were 90° C. for 24 hours. The weight-average molecular weight of the polyurethane elastic fiber according to GPC was 150,000, the polydispersity (Mw/Mn) was 1.5 and the ratio of urea bonds to urethane bonds was 0.5%, while it lacked allophanate bonded crosslinks and had a wound body elongation percentage of 2.0%.

Example 9

A polyurethane resin was produced and a 620 dtex/60 filament polyurethane elastic fiber was obtained by the same method as Example 1, except that the annealing conditions in the hot air oven to obtain the polyurethane resin were 130° C. for 12 hours. The weight-average molecular weight of the polyurethane elastic fiber according to GPC was 200,000, the polydispersity (Mw/Mn) was 2.5 and the ratio of urea bonds to urethane bonds was 0.5%, while it lacked allophanate bonded crosslinks and had a wound body elongation percentage of 2.0%.

Example 10

A polyurethane resin was produced and a 620 dtex/60 filament polyurethane elastic fiber was obtained by the same method as Example 1, except that the annealing conditions in the hot air oven to obtain the polyurethane resin were 150° C. for 8 hours. The weight-average molecular weight of the polyurethane elastic fiber according to GPC was 240,000, the polydispersity (Mw/Mn) was 3.0 and the ratio of urea bonds to urethane bonds was 0.5%, while it lacked allophanate bonded crosslinks and had a wound body elongation percentage of 2.0%.

Example 11

A polyurethane resin was produced and a 620 dtex/60 filament polyurethane elastic fiber was obtained by the same method as Example 1, except that a polytetramethylene ether diol with a number-average molecular weight of 2000 and a polydispersity (Mw/Mn) of 1.5 in GPC was used, and the annealing conditions in the hot air oven to obtain the polyurethane resin were 150° C. for 8 hours. The weight-average molecular weight of the polyurethane elastic fiber according to GPC was 280,000, the polydispersity (Mw/Mn) was 4.0 and the ratio of urea bonds to urethane bonds was 0.5%, while it lacked allophanate bonded crosslinks and had a wound body elongation percentage of 2.0%.

Example 12

A polyurethane resin was produced and a 620 dtex/60 filament polyurethane elastic fiber was obtained by the same method as Example 1, except that a polytetramethylene ether diol with a number-average molecular weight of 2000 and a polydispersity (Mw/Mn) of 1.5 in GPC was used, and the annealing conditions in the hot air oven to obtain the polyurethane resin were 180° C. for 2 hours. The weight-average molecular weight of the polyurethane elastic fiber according to GPC was 350,000, the polydispersity (Mw/Mn) was 5.0 and the ratio of urea bonds to urethane bonds was 0.5%, while it lacked allophanate bonded crosslinks and had a wound body elongation percentage of 2.0%.

Example 13

A polyurethane resin was produced and a 620 dtex/60 filament polyurethane elastic fiber was obtained by the same method as Example 1, except that the ratio of the first godet roller speed and final take-up speed (=final take-up speed/first godet roller) was 1.01 during take-up onto the paper pirn. The weight-average molecular weight of the polyurethane elastic fiber according to GPC was 180,000, the polydispersity (Mw/Mn) was 2.0 and the ratio of urea bonds to urethane bonds was 0.5%, while it lacked allophanate bonded crosslinks and had a wound body elongation percentage of 0.05%.

Example 14

A polyurethane resin was produced and a 620 dtex/60 filament polyurethane elastic fiber was obtained by the same method as Example 1, except that the ratio of the first godet roller speed and final take-up speed (=final take-up speed/first godet roller) was 1.03 during take-up onto the paper pirn. The weight-average molecular weight of the polyurethane elastic fiber according to GPC was 180,000, the polydispersity (Mw/Mn) was 2.0 and the ratio of urea bonds to urethane bonds was 0.5%, while it lacked allophanate bonded crosslinks and had a wound body elongation percentage of 0.1%.

Example 15

A polyurethane resin was produced and a 620 dtex/60 filament polyurethane elastic fiber was obtained by the same method as Example 1, except that the ratio of the first godet roller speed and final take-up speed (=final take-up speed/first godet roller) was 1.10 during take-up onto the paper pirn. The weight-average molecular weight of the polyurethane elastic fiber according to GPC was 180,000, the polydispersity (Mw/Mn) was 2.0 and the ratio of urea bonds to urethane bonds was 0.5%, while it lacked allophanate bonded crosslinks and had a wound body elongation percentage of 1%.

Example 16

A polyurethane resin was produced and a 620 dtex/60 filament polyurethane elastic fiber was obtained by the same method as Example 1, except that the ratio of the first godet roller speed and final take-up speed (=final take-up speed/first godet roller) was 1.20 during take-up onto the paper pirn. The weight-average molecular weight of the polyurethane elastic fiber according to GPC was 180,000, the polydispersity (Mw/Mn) was 2.0 and the ratio of urea bonds to urethane bonds was 0.5%, while it lacked allophanate bonded crosslinks and had a wound body elongation percentage of 5%.

Example 17

A polyurethane resin was produced and a 620 dtex/60 filament polyurethane elastic fiber was obtained by the same method as Example 1, except that the ratio of the first godet roller speed and final take-up speed (=final take-up speed/first godet roller) was 1.30 during take-up onto the paper pirn. The weight-average molecular weight of the polyurethane elastic fiber according to GPC was 180,000, the polydispersity (Mw/Mn) was 2.0 and the ratio of urea bonds to urethane bonds was 0.5%, while it lacked allophanate bonded crosslinks and had a wound body elongation percentage of 10%.

Example 18

A polyurethane resin was produced and a 620 dtex/60 filament polyurethane elastic fiber was obtained by the same method as Example 1, except that the ratio of the first godet roller speed and final take-up speed (=final take-up speed/first godet roller) was 1.35 during take-up onto the paper pirn. The weight-average molecular weight of the polyurethane elastic fiber according to GPC was 180,000, the polydispersity (Mw/Mn) was 2.0 and the ratio of urea bonds to urethane bonds was 0.5%, while it lacked allophanate bonded crosslinks and had a wound body elongation percentage of 12%.

Example 19

A polyurethane resin was produced and a 310 dtex/30 filament polyurethane elastic fiber was obtained by the same method as Example 1, except that after melting the polyurethane in the extruder, it was discharged from a nozzle with a diameter of 0.23 mm and having 30 holes, at a speed of 15.5 g/min. The weight-average molecular weight of the polyurethane elastic fiber according to GPC was 180,000, the polydispersity (Mw/Mn) was 2.0 and the ratio of urea bonds to urethane bonds was 0.5%, while it lacked allophanate bonded crosslinks and had a wound body elongation percentage of 2%.

Example 20

A polyurethane resin was produced and a 940 dtex/90 filament polyurethane elastic fiber was obtained by the same method as Example 1, except that after melting the polyurethane in the extruder, it was discharged from a nozzle with a diameter of 0.23 mm and having 90 holes, at a speed of 47 g/min. The weight-average molecular weight of the polyurethane elastic fiber according to GPC was 180,000, the polydispersity (Mw/Mn) was 2.0 and the ratio of urea bonds to urethane bonds was 0.5%, while it lacked allophanate bonded crosslinks and had a wound body elongation percentage of 2%.

Example 21

A polyurethane resin was produced and a 1220 dtex/120 filament polyurethane elastic fiber was obtained by the same method as Example 1, except that after melting the polyurethane in the extruder, it was discharged from a nozzle with a diameter of 0.23 mm and having 120 holes, at a speed of 61 g/min. The weight-average molecular weight of the polyurethane elastic fiber according to GPC was 180,000, the polydispersity (Mw/Mn) was 2.0 and the ratio of urea bonds to urethane bonds was 0.5%, while it lacked allophanate bonded crosslinks and had a wound body elongation percentage of 2%.

Example 22

A polyurethane resin was produced and a 620 dtex/24 filament polyurethane elastic fiber was obtained by the same method as Example 1, except that after melting the polyurethane in the extruder, it was discharged from a nozzle with a diameter of 0.23 mm and having 24 holes. The weight-average molecular weight of the polyurethane elastic fiber according to GPC was 180,000, the polydispersity (Mw/Mn) was 2.0 and the ratio of urea bonds to urethane bonds was 0.5%, while it lacked allophanate bonded crosslinks and had a wound body elongation percentage of 2%.

Example 23

A polyurethane resin was produced and a 620 dtex/16 filament polyurethane elastic fiber was obtained by the same method as Example 1, except that after melting the polyurethane in the extruder, it was discharged from a nozzle with a diameter of 0.23 mm and having 16 holes. The weight-average molecular weight of the polyurethane elastic fiber according to GPC was 180,000, the polydispersity (Mw/Mn) was 2.0 and the ratio of urea bonds to urethane bonds was 0.5%, while it lacked allophanate-bonded isocyanate group crosslinks and had a wound body elongation percentage of 2%.

Example 24

A polyurethane resin was produced and a 620 dtex/12 filament polyurethane elastic fiber was obtained by the same method as Example 1, except that after melting the polyurethane in the extruder, it was discharged from a nozzle with a diameter of 0.23 mm and having 12 holes. The weight-average molecular weight of the polyurethane elastic fiber according to GPC was 180,000, the polydispersity (Mw/Mn) was 2.0 and the ratio of urea bonds to urethane bonds was 0.5%, while it lacked allophanate bonded crosslinks and had a wound body elongation percentage of 2%.

Example 25

A polyurethane resin was produced and a 620 dtex/60 filament polyurethane elastic fiber was obtained by the same method as Example 1, except that the amount of 1,4-butanediol used for the polymerization reaction was changed to 140.75 g. The weight-average molecular weight of the polyurethane elastic fiber according to GPC was 180,000, the polydispersity (Mw/Mn) was 2.0 and the ratio of urea bonds to urethane bonds was 0.5%, while it had a wound body elongation percentage of 2.0%. The polyurethane elastic fiber dissolved in DMAc but had 0.3% allophanate bonds with respect to urethane bonds according to NMR.

Comparative Example 1

A 620 dtex/60 filament polyurethane elastic fiber was obtained by the same method as Example 1, except that melt spinning was with a temperature of 170° C. for the steam sprayed directly under the spinneret. The weight-average molecular weight of the polyurethane elastic fiber according to GPC was 180,000, the polydispersity (Mw/Mn) was 2.0 and the ratio of urea bonds to urethane bonds was 0.03%, while it lacked allophanate bonded crosslinks and had a wound body elongation percentage of 2.0%.

Comparative Example 2

A 620 dtex/60 filament polyurethane elastic fiber was obtained by the same method as Example 1, except that melt spinning was with the steam sprayed directly under the spinneret set to an area of 1 cm to 20 cm from the spinneret surface. The weight-average molecular weight of the polyurethane elastic fiber according to GPC was 180,000, the polydispersity (Mw/Mn) was 2.0 and the ratio of urea bonds to urethane bonds was 6.0%, while it lacked allophanate bonded crosslinks and had a wound body elongation percentage of 2.0%.

The production conditions in each of the Examples and Comparative Examples and the measurement results for the properties of the obtained polyurethane elastic fibers are shown in Tables 1 to 3 below.

TABLE 1

|  | Example 1 | Example 2 | Example 3 | Example 4 | Example 5 | Example 6 | Example 7 | Example 8 | Example 9 |
| --- | --- | --- | --- | --- | --- | --- | --- | --- | --- |
| Ratio of urea bonds to urethane bonds (%) | 0.5 | 0.05 | 0.1 | 2 | 3 | 5 | 0.5 | 0.5 | 0.5 |
| Mw/Mn | 2 | 2 | 2 | 2 | 2 | 2 | 1.2 | 1.5 | 2.5 |
| Size (dtex) | 620 | 620 | 620 | 620 | 620 | 620 | 620 | 620 | 620 |
| Monofilament size (dtex) | 10 | 10 | 10 | 10 | 10 | 10 | 10 | 10 | 10 |
| Number of filaments | 60 | 60 | 60 | 60 | 60 | 60 | 60 | 60 | 60 |
| Elongation percentage on wound body (%) | 2 | 2 | 2 | 2 | 2 | 2 | 2 | 2 | 2 |
| Allophanate bonded crosslinks present | No | No | No | No | No | No | No | No | No |
| Unwinding property | 5 | 4 | 5 | 5 | 4 | 3 | 4 | 5 | 5 |
| Heat resistance | 5 | 4 | 5 | 5 | 4 | 2 | 4 | 5 | 5 |
| Adhesion | 5 | 5 | 5 | 5 | 4 | 2 | 4 | 5 | 5 |
| Overall evaluation | 5 | 4 | 5 | 5 | 4 | 2 | 4 | 5 | 5 |

TABLE 2

|  | Example 10 | Example 11 | Example 12 | Example 13 | Example 14 | Example 15 | Example 16 | Example 17 | Example 18 |
| --- | --- | --- | --- | --- | --- | --- | --- | --- | --- |
| Ratio of urea bonds to urethane bonds (%) | 0.5 | 0.5 | 0.5 | 0.5 | 0.5 | 0.5 | 0.5 | 0.5 | 0.5 |
| Mw/Mn | 3 | 4 | 5 | 2 | 2 | 2 | 2 | 2 | 2 |
| Size (dtex) | 620 | 620 | 620 | 620 | 620 | 620 | 620 | 620 | 620 |
| Monofilament size (dtex) | 10 | 10 | 10 | 10 | 10 | 10 | 10 | 10 | 10 |
| Number of filaments | 60 | 60 | 60 | 60 | 60 | 60 | 60 | 60 | 60 |
| Elongation percentage on wound body (%) | 2 | 2 | 2 | 0.05 | 0.1 | 1 | 5 | 10 | 12 |
| Allophanate bonded crosslinks present | No | No | No | No | No | No | No | No | No |
| Unwinding property | 4 | 3 | 2 | 4 | 5 | 5 | 5 | 4 | 4 |
| Heat resistance | 4 | 3 | 5 | 5 | 5 | 5 | 5 | 5 | 5 |
| Adhesion | 4 | 3 | 2 | 5 | 5 | 5 | 5 | 5 | 4 |
| Overall evaluation | 4 | 3 | 2 | 4 | 5 | 5 | 5 | 4 | 4 |

TABLE 3

|  | Example 19 | Example 20 | Example 21 | Example 22 | Example 23 | Example 24 | Example 25 | Comparative Example 1 | Comparative Example 2 |
| --- | --- | --- | --- | --- | --- | --- | --- | --- | --- |
| Ratio of urea bonds to urethane bonds (%) | 0.5 | 0.5 | 0.5 | 0.5 | 0.5 | 0.5 | 0.5 | 0.03 | 6 |
| Mw/Mn | 2 | 2 | 2 | 2 | 2 | 2 | 2 | 2 | 2 |
| Size (dtex) | 310 | 940 | 1220 | 620 | 620 | 620 | 620 | 620 | 620 |
| Monofilament size (dtex) | 10 | 10 | 10 | 26 | 39 | 52 | 10 | 10 | 10 |
| Number of filaments | 30 | 90 | 120 | 24 | 16 | 12 | 60 | 60 | 60 |
| Elongation percentage on wound body (%) | 2 | 2 | 2 | 2 | 2 | 2 | 2 | 2 | 2 |
| Allophanate bonded crosslinks present | No | No | No | No | No | No | Yes | No | No |
| Unwinding property | 5 | 5 | 5 | 5 | 5 | 4 | 4 | 1 | 5 |
| Heat resistance | 5 | 5 | 5 | 5 | 5 | 5 | 5 | 1 | 5 |
| Adhesion | 5 | 5 | 5 | 5 | 4 | 3 | 5 | 5 | 1 |
| Overall evaluation | 5 | 5 | 5 | 5 | 4 | 3 | 4 | 1 | 1 |

INDUSTRIAL APPLICABILITY

The polyurethane elastic fiber of the invention can be suitably used for production of clothing such as inner wear, stockings, compression wear and diapers, and during production steps for gather members in particular, its satisfactory heat resistance, adhesion and unwinding property allow yarn breakage to be reduced.

REFERENCE SIGNS LIST

1 Elastic fiber wound body
2 Delivery roll
3 Pre-draft roll
4 Take-up roll
5 Observation zone
6 Ceramic hook guide 7 Bearing-free roller

The invention claimed is:

1. Polyurethane elastic fiber which is a multifilament and includes urethane bonds and urea bonds, wherein a percentage of urea bonds to urethane bonds is 0.05% to 5%.

2. The polyurethane elastic fiber according to claim 1, wherein the polyurethane elastic fiber has a polydispersity (Mw/Mn) of 1.2 to 4.0.

3. The polyurethane elastic fiber according to claim 1, wherein the polyurethane elastic fiber has a monofilament fineness of 5 dtex to 40 dtex.

4. The polyurethane elastic fiber according to claim 1, wherein the number of filaments is 15 or greater.

5. The polyurethane elastic fiber according to claim 1, which is thermoplastic.

6. The polyurethane elastic fiber according to claim 1, which is free of allophanate bond crosslinks.

7. A wound body of a polyurethane elastic fiber, which is a wound body including polyurethane elastic fiber according to claim 1 wherein the elongation percentage of the polyurethane elastic fiber in the wound body is 0.05% to 10%.

8. A gather member which includes a polyurethane elastic fiber according to claim 1.

9. A hygienic material which includes a polyurethane elastic fiber according to claim 1.

* * * * *